(12) United States Patent
Yamanaka

(10) Patent No.: US 7,474,599 B2
(45) Date of Patent: Jan. 6, 2009

(54) OPTICAL DISC MEDIUM, AND APPARATUS AND METHOD FOR RECORDING DATA ON THE SAME

(75) Inventor: Yutaka Yamanaka, Tokyo (JP)

(73) Assignee: Nec Corporation (JP)

( * ) Notice: Subject to any disclaimer, the term of this patent is extended or adjusted under 35 U.S.C. 154(b) by 599 days.

(21) Appl. No.: 11/019,926

(22) Filed: Dec. 22, 2004

(65) Prior Publication Data

US 2005/0141377 A1 Jun. 30, 2005

(30) Foreign Application Priority Data

Dec. 26, 2003 (JP) .......................... 2003/433475
Apr. 5, 2004 (JP) .......................... 2004/111513

(51) Int. Cl.
*G11B 7/00* (2006.01)
(52) U.S. Cl. .................. 369/53.21; 369/53.24
(58) Field of Classification Search ............. 369/275.3, 369/44.13, 47.27, 53.24, 53.21
See application file for complete search history.

(56) References Cited

U.S. PATENT DOCUMENTS

| | | | |
|---|---|---|---|
| 4,748,611 A | 5/1988 | Tsuyoshi et al. |
| 4,937,804 A | 6/1990 | Ishihara |
| 5,058,096 A | 10/1991 | Ando et al. |
| 5,457,674 A | 10/1995 | Watanabe et al. |
| 5,777,965 A | 7/1998 | Itami et al. |
| 5,815,472 A | 9/1998 | Kuroda et al. |
| 5,832,200 A | 11/1998 | Yoda |
| 5,907,658 A | 5/1999 | Murase et al. |
| 5,940,364 A | 8/1999 | Ogata et al. |
| 5,940,853 A | 8/1999 | Ooi et al. |
| 5,978,336 A | 11/1999 | Mine et al. |
| 6,021,250 A | 2/2000 | Hyodo et al. |
| 6,075,920 A | 6/2000 | Kawamura et al. |
| 6,330,392 B1 | 12/2001 | Nakatani et al. |

(Continued)

FOREIGN PATENT DOCUMENTS

EP 0 817 195 A2 1/1998

(Continued)

OTHER PUBLICATIONS

List of Prior Arts for Information Disclosure Statement prepared by Japanese Associate for filing in connection with the instant application—2 pages.

(Continued)

*Primary Examiner*—Nabil Z Hindi
(74) *Attorney, Agent, or Firm*—Ostrolenk, Faber, Gerb & Soffen, LLP

(57) ABSTRACT

An optical disc medium includes a system area and a data area. The system area includes a recording operation test area to which a trial recording operation is carried out to determine an optimal record condition when data is recorded in the data area; a record control data area where data necessary to record user data on the data area is recorded; and a user data lead-in area necessary to reproduce the user data from the optical disc medium. Dummy data are recorded to a portion of the record control data area on a side of the user data lead-in area to prevent a track-out when the data area is accessed.

12 Claims, 14 Drawing Sheets

U.S. PATENT DOCUMENTS

| | | | |
|---|---|---|---|
| 6,333,904 | B1 | 12/2001 | Hashimoto |
| 6,560,181 | B1 | 5/2003 | Takahashi |
| 6,600,707 | B2 | 7/2003 | Tsukada |
| 6,621,783 | B1 | 9/2003 | Murata |
| 6,628,584 | B1 | 9/2003 | Heemskerk et al. |
| 6,628,602 | B2 | 9/2003 | Ohno et al. |
| 6,636,461 | B2 | 10/2003 | Tsukada et al. |
| 6,728,186 | B2 | 4/2004 | Wejenbergh et al. |
| 6,876,612 | B2 | 4/2005 | Yoneyama et al. |
| 6,904,008 | B2 | 6/2005 | Kawashima et al. |
| 7,050,701 | B1 | 5/2006 | Sasaki et al. |
| 7,085,221 | B2 * | 8/2006 | Lee et al. .................. 369/275.3 |
| 7,196,992 | B2 | 3/2007 | Kim |
| 7,206,270 | B2 * | 4/2007 | Kuroda .................... 369/53.21 |
| 7,313,066 | B2 * | 12/2007 | Hwang et al. ............ 369/53.17 |
| 2002/0024923 | A1 | 2/2002 | Ohno et al. |
| 2002/0136134 | A1 | 9/2002 | Ito et al. |
| 2003/0067859 | A1 | 4/2003 | Weijenbergh et al. |
| 2003/0081525 | A1 | 5/2003 | Yoneyama et al. |
| 2003/0142609 | A1 | 7/2003 | Tsumagari et al. |
| 2003/0214890 | A1 | 11/2003 | Lee et al. |
| 2004/0090886 | A1 | 5/2004 | Sasaki |
| 2005/0152235 | A1 | 7/2005 | Hoshizawa |
| 2006/0176787 | A1 | 8/2006 | Blum |

FOREIGN PATENT DOCUMENTS

| | | |
|---|---|---|
| EP | 1 083 748 A2 | 3/2001 |
| EP | 1 291 871 A2 | 3/2003 |
| JP | 10-255266 | 9/1998 |
| JP | 09-288825 | 11/1999 |
| JP | 2000-195054 | 11/1999 |
| JP | 2001-307334 | 11/1999 |
| JP | 2002-342930 | 11/1999 |
| JP | 2003-123256 | 11/1999 |
| JP | 2000-48370 | 2/2000 |
| JP | 2000-76786 | 3/2000 |
| JP | 2000-113458 | 4/2000 |
| JP | 2000-504462 | 4/2000 |
| JP | 2000-504463 | 4/2000 |
| JP | 2001-110055 | 4/2001 |
| JP | 2001-202621 | 7/2001 |
| JP | 2001-291245 | 10/2001 |
| JP | 2001-312879 | 11/2001 |
| JP | 2002-208139 | 7/2002 |
| JP | 2002-312940 | 10/2002 |
| JP | 2003-173528 | 6/2003 |
| JP | 2003-228853 | 8/2003 |
| JP | 2003-249020 | 9/2003 |
| JP | 2003-331430 | 11/2003 |
| JP | 2004-103078 | 4/2004 |
| JP | 2005-310321 | 11/2005 |
| JP | 2005-327385 | 11/2005 |
| WO | WO 03/075265 A2 | 9/2003 |
| WO | WO 03/107333 A1 | 12/2003 |

OTHER PUBLICATIONS

*ECMA Standardizing Information and Communication Systems*, 800 mm (1,46 Gbytes per side) and 120mm (4,70 Gbytes per side) DVD Re-Recordable Disk (DVD-RW), Standard ECMA-338, Dec. 2002, XP-002339283, 148 pages.

Pioneer Corporation, *DVD Recording—Technical Information—Pioneer Australia*, Copyright 2002, pp. 1-3; XP-002339284.

*ECMA Standardizing Information and Communication Systems*, 120 mm DVD—Read-Only Disk, Standard ECMA—26, 3$^{rd}$ Edition, Apr. 2001; XP-002186785; 83 pages.

English translation of Japanese Office Action issued in connection with 2007-107332 submitted in lieu of statement of relevancy of prior art teachings to the instant application.

Untranslated Japanese Action issued on Feb. 29, 2008 in connection with corresponding Japanese application No. 2007-107332.

Search Report issued by European Patent Office on Mar. 2, 2007 in connection with corresponding European patent application No. EP 05 10 3245.

Untranslated Japanese Action issued on Feb. 14, 2007 in connection with corresponding Japanese application No. 2004-111513.

English translation of Japanese Office Action issued in connection with 2004-111513 submitted in lieu of statement of relevancy of prior art teachings to the instant application.

Untranslated Japanese Action issued on Mar. 6, 2008 in connection with corresponding Japanese application No. 2004-111513.

Search Report issued by European Patent Office on Mar. 2, 2007 in connection with corresponding European patent application No. EP 05 10 3248.

Office Action issued by U.S. Patent Office on May 21, 2008 in connection with corresponding U.S. Appl. No. 11/111,758.

Office Action issued by U.S. Patent Office on Apr. 24, 2008 in connection with corresponding U.S. Appl. No. 11/113,983.

Office Action issued bu U.S. Patent Office on Sep. 8, 2008 in connection with corresponding U.S. Appl. No. 10/962,712.

Pioneer Corporation, "Mt. Fuji Commands for Multimedia Devices SFF8090i v5", SFF Committee Specification, Feb. 18, 2004, pp. 115-175.

English translation of Japanese version of Examiner's comments in Taiwanese Office Action submitted as a statement of relevancy of the prior art against instant application.

Partial Japense translation of relevant parts of Taiwanese Office Action issued Aug. 15, 2008 against Taiwanese application corresponding to counterpart U.S. Appl. No 11/113,983.

Office Action issued by Taiwanese Patent Office on Aug. 15, 2008 in connection with corresponding Taiwanese Patent Application No. 097204293500.

Office Action issued by U.S. Patent Office on Aug. 19, 2008 in connection with corresponding U.S. Appl. No. 11/165,199.

Office Action issued by Japanese Patent Office on Aug. 18, 2008 in connection with corresponding Japanese Patent Application No. 2003-353385.

Partial English translation of Japanese Office Action issued Aug. 18, 2008 submitted as a statement of relevancy of the prior art against instant application.

* cited by examiner

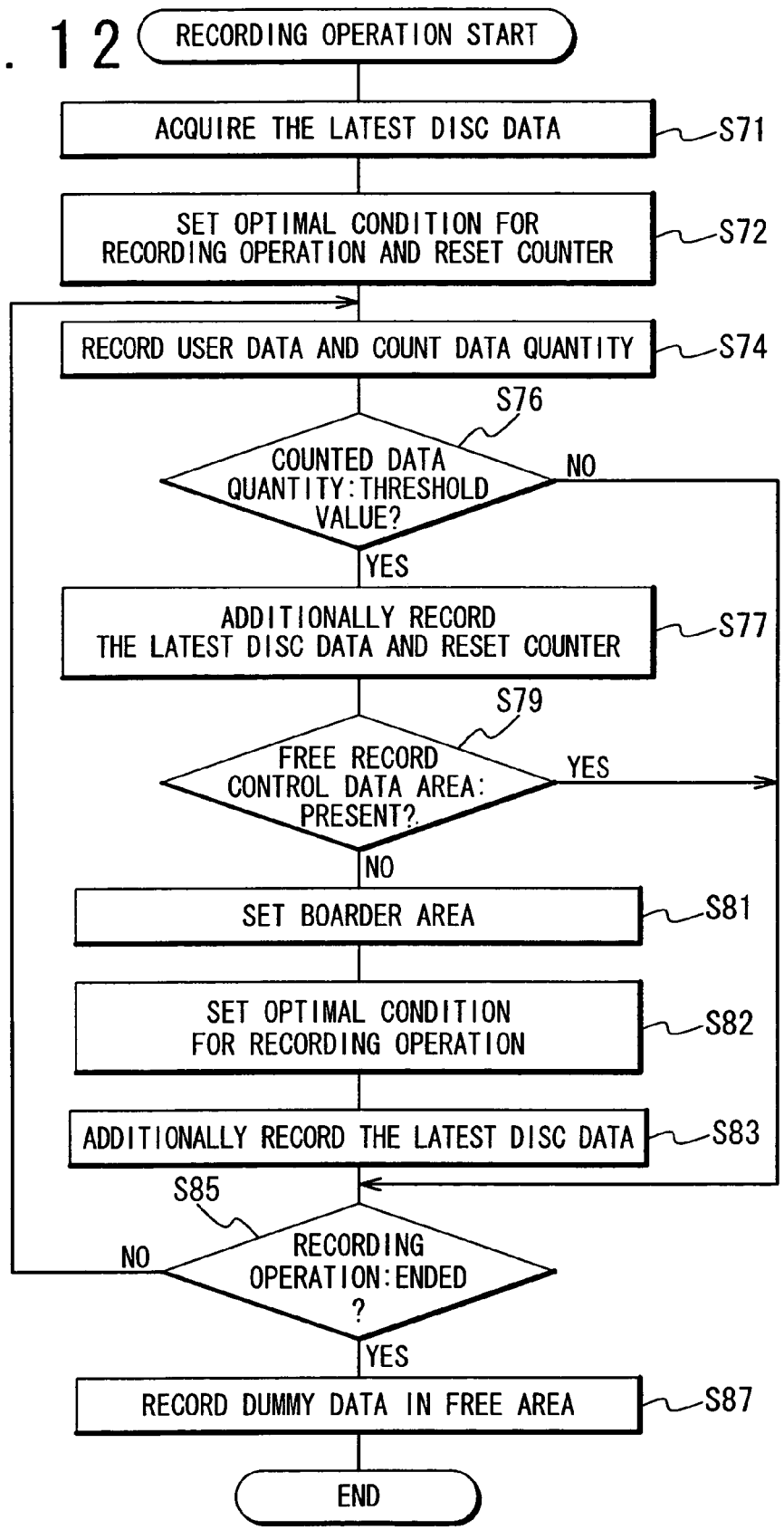

Fig. 14A
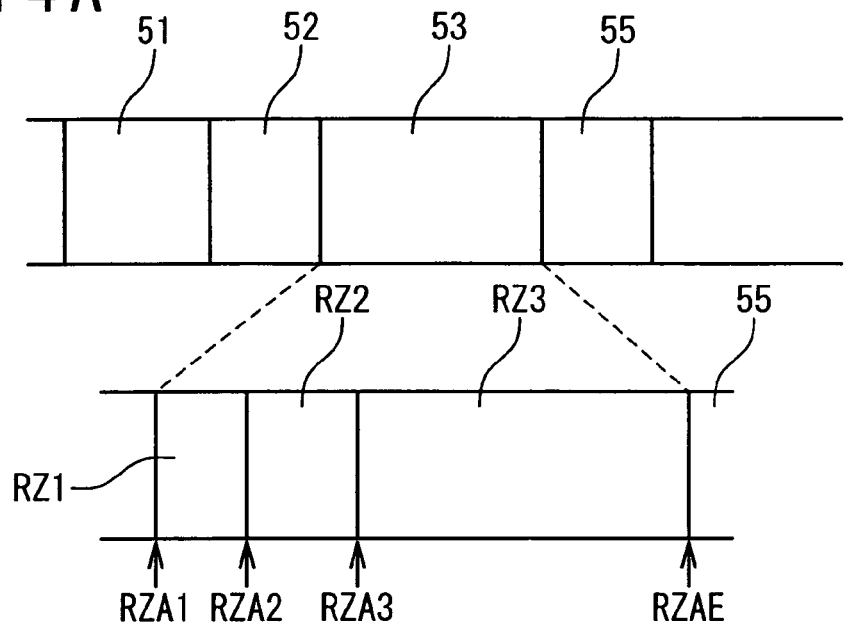
Fig. 14B
|  | START ADDRESS | END ADDRESS |
|---|---|---|
| RZ1 | RZA1 | RZA2-1 |
| RZ2 | RZA2 | RZA3-1 |
| RZ3 | RZA3 | RZAE |
Fig. 14C
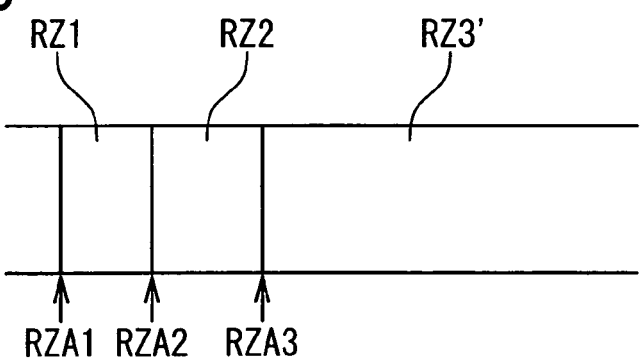
Fig. 14D
|  | START ADDRESS | END ADDRESS |
|---|---|---|
| RZ1 | RZA1 | RZA2-1 |
| RZ2 | RZA2 | RZA3-1 |
| RZ3 | RZA3 |  |

OPTICAL DISC MEDIUM, AND APPARATUS AND METHOD FOR RECORDING DATA ON THE SAME

BACKGROUND OF THE INVENTION

1. Field of the Invention

The present invention relates to an optical disc medium and an apparatus and method for recording and reproducing data on and from the optical disc medium.

2. Description of the Related Art

In optical disc media, in which data is recorded by using minute optical spots, a ROM (Read Only Memory) medium was popularized on which a sequence of embossed data pits was previously formed. Subsequently, data recordable type optical discs such as CD-R (Compact Disc-Recordable) and DVD-R (Digital Versatile Disc-Recordable) have been widely used. Also, optical disc media such as so-called CD-RW (CD-ReWritable) and DVD-RW (DVD-ReWritable) are known in which data can be rewritten. Here, the optical disc medium on which data can be recorded by a user is referred to as a recordable type optical disc medium.

In the recordable type optical disc medium, a spiral groove track is formed on an optical disc substrate for tracking and a multi-layer record layer of organic materials is formed on it, for example. Data are recorded by focusing a high-power laser beam onto the record layer, to partially change the property of the record layer for forming record pits therein. The recorded data can be reproduced by a read-only disc drive apparatus, since such a medium has a same data format as a ROM medium having an embossed data pit sequence after a recording operation so that a same servo signal as from the ROM medium can be reproduced.

In the DVD-R medium, user data is converted in format to have additional data, e.g., data ID as an address and error correction code, and the converted user data is recorded as a sequence of continuous data on the optical disc medium. The format in which data are continuously recorded is same as that of a DVD-ROM medium.

However, if the format is completely the same as that of the DVD-ROM medium, the recording operation can be carried out only once. For this reason, so-called multi-session and multi-border recording methods are set to allow data to be recorded for several times. In this case, special data so-called border area data are recorded behind user data to contain record location data, and then new user data is recorded behind the border area data. Thus, a data reproducing apparatus reproduces the user data by using the record location data.

As shown in FIG. 3, a recordable optical disc medium 6 has a spiral record track 24. The record track 24 has concentrically a system area 22, a data area 23, and a read-out area (not shown) outward from the center.

The system area 22 is used to record system data necessary for recording and reproducing operations, such as disc data and an area for data recorded by a user. In this system area 22, there are an area for recording disc control data and an area for the test of a recording condition.

The read-out area is an area that indicates the end of the recording area of the disc. When the read-out area is detected, the end of the recording area on the optical disc medium is recognized.

The data area 23 is provided on the outer side of the system area 22 to record the user data.

FIG. 4 shows the data structure of the optical disc medium 6 in one dimension. As shown in FIG. 4, in the data structure on the optical disc medium 6 in the radial direction, the left side is on the side of a disc inner circumference, while the right side is on the side of a disc outer circumference. The system area 22 on the inner circumference side is an area where system control data necessary for optical disc apparatus to record and reproduce data, data indicating a record location of data on the optical disc medium 6, and the like are recorded. The system area 22 is mainly classified into three areas: a recording operation test area 26, a record control data area 27, and a user data lead-in area 28.

The user data lead-in area 28 is provided in an area closest to the data area 23. The system control data necessary for a read-only optical disc apparatus to reproduce data on a recordable optical disc medium on which data is already recorded is mainly recorded in the area.

In the record control data area 27 are mainly recorded data necessary for the optical disc recording apparatus to record the user data onto the data area 23, i.e., data indicating the next location for user data to be recorded in the data area 23 and usage status of the recording operation test area 26. The data in the area 27 is updated each time the data is recorded additionally in the data area 23. Accordingly, new data are recorded in the area 27 from the inner circumference side to the outer circumference side in a predetermined unit.

The recording operation test area 26 is an area used to carry out a trial recording operation for checking an optimal recording condition. The trial recording operation is carried out while altering the power and waveform of a laser beam, to optimize the recording condition into the data area 23. Area portions of the recording operation test area 26 may be used in an optional order, but the outer area is usually used first.

FIG. 6 is a flow chart showing a recording operation for recording user data on the optical disc medium. When the user data is recorded, a recording operation preparing process (S11) is first carried out. In the recording operation preparing process, a trial recording operation is carried out while altering writing power or waveform of a laser beam by using recording operation test area 26, and the optimal recording condition for recording the user data is determined. The optimal recording condition is set as a condition for recording the user data in the data area 23 (S11) After the setting of the recording condition, a user data recording process is carried out to record user data in the data area 23 (S12).

After the user data recording process is ended, a recording operation end process is carried out (S13). The recording operation end process is sometimes called a finalizing process, and is a process for allowing the user data to be reproduced by a read-only optical disc apparatus. In the recording operation end process, a continuous record pit sequence having a length is formed before or after the user data to allowing reliable access by the read-only optical disc apparatus, because the read-only optical disc apparatus can access stably only to an area where the record pits are formed continuously.

As shown in FIG. 5, after the recording operation end process, there are the area where the record pits are formed and the area where the record pits are not formed. There are a data recorded area 23a and a data free area 23b in the data area 23. When the recorded data quantity is smaller in the data area 23 or when the number of times of an additional recording operation is smaller, a record control data recorded area 27a and a control data free area 27b are present in the record control data area 27 and a recorded area 26a and a free area 26b are present in the recording operation test area 26.

Data necessary for the reproducing apparatus to reproduce the recorded data on the optical disc medium 6 is recorded in the user data lead-in area 28. The data quantity of the user data lead-in area 28 is not so large. However, the user data lead-in area 28 is also used as a guard area 30 for prevention of the tracking-out when the data area 23 is accessed. For this reason, the user data lead-in area 28 is required to have the width-of 100 μm or more in the radial direction. In the recording operation end process to an actual optical disc medium 6, the guard area is often formed additionally outside the recorded user data in the data area 23.

In the read-only optical disc apparatus, since a track error signal is generally detected from the record pits, it is not possible to access to the free area. Therefore, the user data lead-in area 28 and the data recorded area 23a in the data area 23 which form a sequence of record pits, are the reproducible area by any type of optical disc apparatus.

The system area 22 is an area essential for the optical disc apparatus to record and reproduce data, although the area is invisible to a user. Accordingly, the capacity of the optical disc medium recognized by the user is the capacity of data area. Because the optical disc medium is desired to have a capacity as large as possible, the system area is desired to be smaller.

However, as described above, it is difficult to reduce the system area, for ensuring the number of times of the addition recording operation and the stability of the read-only optical disc apparatus.

In conjunction with the above description, an optical disc is disclosed in Japanese Laid Open Patent Application (JP-P2000-48370A). The optical disc in this conventional example has a reproduction exclusive area where a plurality of reproduction exclusive tracks are formed and the rewritable area where a plurality of rewritable tracks are formed. Each of the plurality of reproduction exclusive tracks is divided into a plurality of first sectors, and a signal of a predetermined reproduction format is previously recorded to at least one of the plurality of first sectors. At least one of the plurality of first sectors has compatibility with a reproduction exclusive optical disc in which the signal of the predetermined reproduction format is previously recorded. Each of the plurality of rewritable tracks is divided into a plurality of second sectors. A signal of any of predetermined record formats which contains the predetermined reproduction format can be recorded in at least one of the plurality of second sectors. The reproduction exclusive area is arranged on the internal circumference side of the optical disc side and the rewritable area is arranged on the outer circumference side of the optical disc.

Also, an optical disc recording method is disclosed in Japanese Laid Open Patent Application (JP-P2003-249020A). In this conventional example, the last position data of the recorded data on an optical disc to which a recording operation cannot be carried out and data of an initial record possible capacity are detected. A data record possible capacity of a free area is determined from the last position data of the recorded data of the optical disc and the data of the initial record possible capacity, and data is recorded to the free area subsequent to the last position indicated by the last position data.

Also, an information recording method is disclosed in Japanese Laid Open Patent Application (JP-P2002-208139A). In this conventional example, a recording operation is carried out to keep a record linear density approximately constant while changing a record clock period according to the change of the record line speed, when mark data is recorded onto an optical disc medium which has a record layer by a laser beam with a light emission waveform determined based on a record pulse string. Also, when the recording operation is carried out using a record power calculated from an approximate equation to get the record power corresponding to the change of the record line speed, data recorded in an end portion of a recorded area as one of a plurality of record areas obtained by dividing an area of the optical disc medium in a radial direction is reproduced. The approximate equation is derived to which a correction of the record power is carried out such that an ideal signal characteristic is gotten from the signal characteristic gotten from the reproduction signal. The recording operation is carried out using the record power which is calculated from the approximate equation to each area.

SUMMARY OF THE INVENTION

An object of the present invention is to provide an optical disc medium and an apparatus and method for recording data on the same, in which a recordable capacity of the optical disc medium can be increased.

Another object of the present invention is to provide an optical disc medium and an apparatus and method for recording data on the same, in which the number of times of an additional recording operation can be increased.

Still another object of the present invention is to provide an optical disc medium and an apparatus and method for recording data on the same, in which a recording operation can be carried out over the entire optical disc medium in good quality.

Still another object of the present invention is to provide an optical disc medium and an apparatus and method for recording data on the same, in which an optimal recording operation can be carried out to areas different in recording speed.

In an aspect of the present invention, an optical disc medium includes a system area and a data area. The system area includes a recording operation test area to which a trial recording operation is carried out to determine an optimal record condition when data is recorded in the data area; a record control data area where data necessary to record user data on the data area is recorded; and a user data lead-in area necessary to reproduce the user data from the optical disc medium. Dummy data are recorded to a portion of the record control data area on a side of the user data lead-in area to prevent a track-out when the data area is accessed.

Here, the dummy data may be recorded until a width of the portion in a radial direction becomes a predetermined value or more.

In another aspect of the present invention, an optical disc medium includes a system area and a data area. The system area includes a recording operation test area to which a trial recording operation is carried out to determine an optimal record condition when a recording operation is carried out to the data area; a record control data area where data necessary to record user data in the data area is recorded; and a user data lead-in area necessary to reproduce the user data from the optical disc medium. An extended record control data area where data necessary to record the user data to the data area is recorded is provided in the data area.

Here, a capacity of the extended record control data area may change depending on a position of the extended record control data area in a radial direction.

Also, a capacity of the extended record control data area may change depending on a capacity of a free portion of the data area where no data are recorded.

Also, a capacity of the extended record control data area may decrease step-by-step toward the outermost circumference. In this case, the capacity of the extended record control data area may change into 3 steps.

Also, when a number of times of the recording operation to the record control data area reaches a predetermined value, the extended record control data area may be set newly in the data area.

Also, the extended record control data area may be provided when the outermost of a plurality of reserved recording areas secured when the user data are recorded is closed.

Also, the data recorded in the record control data area or the extended record control data area may contain an address indicative of a location of the extended record control data area.

Also, a trial recording operation may be carried out to an extended recording operation test area provided into the data area.

Also, the extended recording operation test area may be identified based on a flag recorded in an area which is provided in the data area.

In another aspect of the present invention, an optical disc medium includes a system area and a data area. The system area includes a recording operation test area to which a trial recording operation is carried out to determine an optimal record condition when data is recorded in the data area; a record control data area where the data necessary to record user data in the data area is recorded; and a user data lead-in area which is necessary to reproduce the user data from the optical disc medium. A part of data to be recorded in the record control data area is recorded in a pre-pit area which is provided on an inner circumference side of the system area.

Here, the pre-pit area may be provided apart from a recording track containing the system area and the data area.

Also, the pre-pit area may be previously formed when the optical disc medium is manufactured.

In another aspect of the present invention, an optical disc apparatus which reads out data recorded in the pre-pit area of the optical disc medium described above.

In another aspect of the present invention, an optical disc apparatus which drives an optical disc medium includes a system area and a data area. The system area includes a recording operation test area to which a trial recording operation is carried out to determine an optimal record condition when data is recorded in the data area; a record control data area where data necessary to record user data on the data area is recorded; and a user data lead-in area necessary to reproduce the user data from the optical disc medium. Dummy data are recorded to a portion of the record control data area on a side of the user data lead-in area to prevent a track-out when the data area is accessed.

Here, the dummy data may be recorded until a width of the portion in a radial direction becomes a predetermined value or more.

In another aspect of the present invention, an optical disc apparatus includes a system area and a data area. The system area includes a recording operation test area to which a trial recording operation is carried out to determine an optimal record condition when a recording operation is carried out to the data area; a record control data area where record control data necessary to record user data in the data area is recorded; and a user data lead-in area necessary to reproduce the user data from the optical disc apparatus. The record control data is recorded in an extended record control data area is provided in the data area.

Here, a capacity of the extended record control data area may change depending on a position of the extended record control data area in a radial direction.

Also, a capacity of the extended record control data area changes depending on a capacity of a free portion of the data area where no data are recorded.

Also, a capacity of the extended record control data area may decrease step-by-step toward the outermost circumference.

Also, when a number of times of the recording operation to the record control data area reaches a predetermined value, the extended record control data area may be set newly in the data area.

Also, it is notified to a host unit that a number of times of the recording operation is a predetermined number of times when the outermost of a plurality of reserved recording areas secured when the user data are recorded is closed.

Also, the optical disc apparatus may set the extended record control data area in the data area in response to an instruction from the host unit.

Also, the optical disc apparatus set the extended record control data area as well as notifies a fact that the number of times of the recording operation reaches a predetermined number of times.

Also, the optical disc apparatus may record an address indicative of a location of the extended record control data area in the record control data area or the extended record control data area.

Also, the optical disc apparatus may carry out a trial recording operation to an extended recording operation test area provided into the data area. In this case, the optical disc apparatus may identify the extended recording operation test area based on a flag recorded in a flag area which is provided in the data area.

30. An optical disc data recording method is achieved by providing an optical disc medium in an optical disc apparatus including a system area and a data area, and recording dummy data in a portion of the record control data area on a side of the user data lead-in area to prevent a track-out when the data area is accessed. The system area includes a recording operation test area to which a trial recording operation is carried out to determine an optimal record condition when data is recorded in the data area; a record control data area where the data necessary to record user data in the data area is recorded; and a user data lead-in area which is necessary to reproduce the user data from the optical disc apparatus.

Here, the recording dummy data may include recording the dummy data until a width of the portion in a radial direction becomes a predetermined value or more.

In another aspect of the present invention, an optical disc data recording method includes providing an optical disc medium including a system area and a data area, and by recording data necessary to record the user data in the data area in the data area. The system area includes a recording operation test area to which a trial recording operation is carried out to determine an optimal record condition when a recording operation is carried out to the data area; a record control data area where data necessary to record user data in the data area is recorded; and a user data lead-in area necessary to reproduce the user data from the optical disc medium.

Here, the optical disc data recording method may further include newly securing the extended record control data area where data necessary to record user data are recorded, when a number of times of the recording operation to the record control data area reaches a predetermined value.

Also, the optical disc data recording method may further include carrying out a trial recording operation to an extended recording operation test area provided into the data area.

Also, the optical disc data recording method may further include identifying the extended recording operation test area based on a flag recorded in a flag area which is provided in the data area.

BRIEF DESCRIPTION OF THE DRAWINGS

FIG. 12 is a flow chart illustrating a recording operation to the optical disc medium according to the third embodiment of the present invention;

FIGS. 14A to 14D are diagrams illustrating the arrangement of respective areas of the optical disc medium according to a fifth embodiment of the present invention and start and end addresses;

DESCRIPTION OF THE PREFERRED EMBODIMENTS

Hereinafter, an optical disc medium and an optical disc apparatus of a data recording system according to the present invention will be described with reference to the attached drawings.

Figure 1:
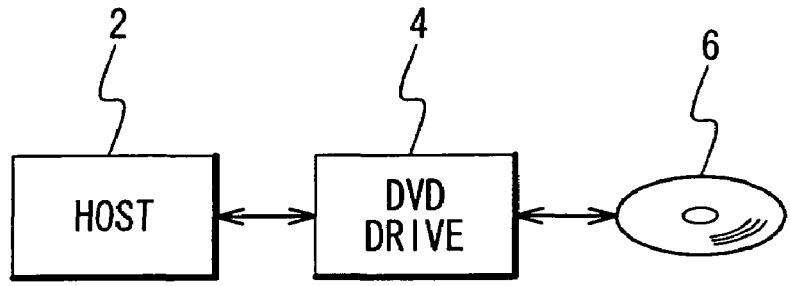
FIG. 1 is a block diagram showing the configuration of a data recording system of the present invention.

FIG. 1 is a block diagram showing the configuration of the data recording system of the present invention. An optical disc apparatus such as a DVD drive 4 is loaded with an optical disc medium 6 such as a DVD disc and records or reproduces data on or from the optical disc medium 6 in response to an instruction from a host unit 2. Also, the optical disc apparatus 4 carries out a training process for determining and adjusting a record condition in response to an instruction from the host unit 2 before start of a recording operation.

Figure 2:
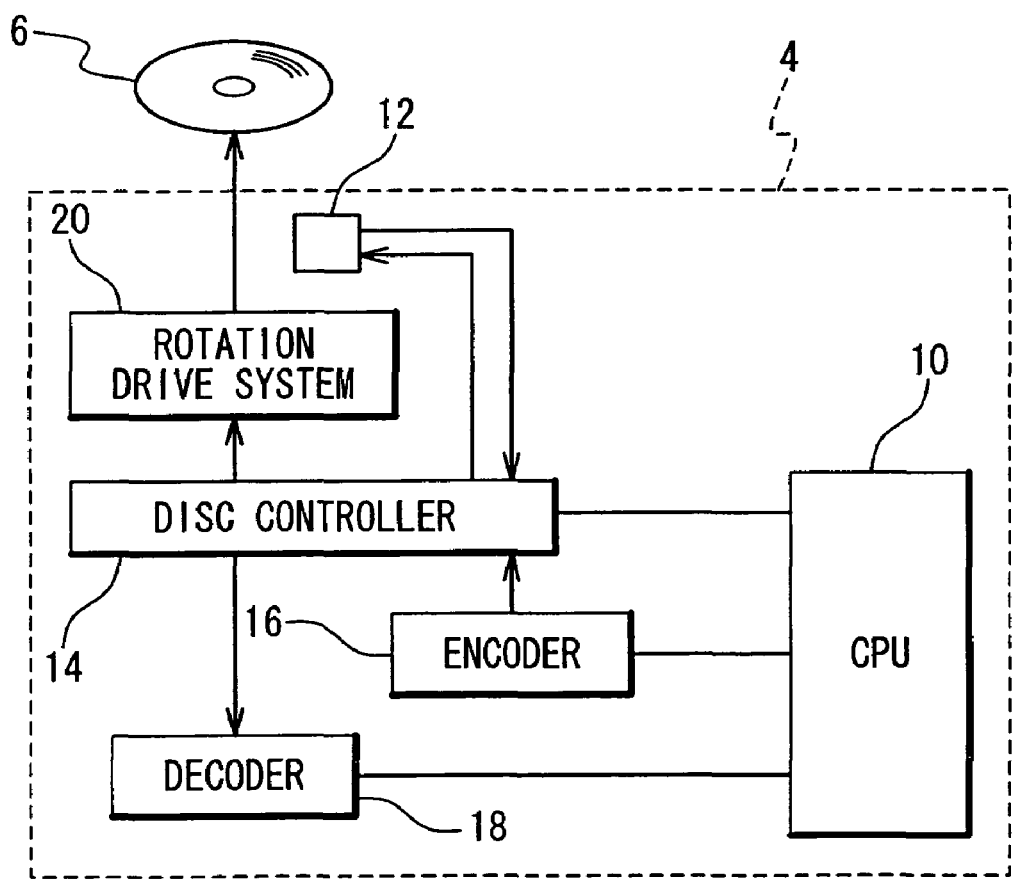
FIG. 2 shows the configuration of the optical disc apparatus according to a first embodiment of the present invention.

FIG. 2 shows the configuration of the optical disc apparatus 4 according to the first embodiment of the present invention. As shown in FIG. 2, the optical disc apparatus 4 in the first embodiment includes a CPU 10, an access unit 12, a disc controller 14, an encoder 16, a decoder 18, and a rotation-driving unit 20.

The CPU 10 controls the entire operation of the optical disc apparatus 4 in response to instructions from the host unit 2. The CPU 10 exchanges instructions, notices, and data with the host unit 2, and controls the disc controller 14, the encoder 16, and the decoder 18. The CPU 10 also carries out necessary calculations. The access unit 12 records data on the optical disc medium 6 and reproduces the data on the optical disc medium 6 by using a laser beam. The access unit 12 is well known to a person skilled in the art. The rotation driving unit 20 drives the optical disc medium 6 to rotate in response to an instruction from the CPU 10 when the optical disc medium 6 is set in the apparatus 4. The disc controller 14 controls the access unit 12 and the rotation driving unit 20 with respect to the rotation of the optical disc medium 6, laser irradiation, and recording/reproducing operations of data. The disc controller 14 controls the rotation driving unit 20 to rotate the optical disc medium 6 in response to an instruction from the CPU 10. The disc controller 14 controls the position of the access unit 12 in response to an instruction from the CPU 10. The disc controller 14 also controls the operation of the access unit 12 in the recording and reproducing operation. In the recording operation, the disc controller 14 controls the access unit 12 to record data supplied from the encoder 16 on the optical disc medium 6. The access unit 12 records the data on the optical disc medium 6 by irradiating a laser beam. Alternatively, in the reproducing operation, the disc controller 14 controls the access unit 12 to reproduce the data from the optical disc medium 6. The access unit 12 reproduces the data on the optical disc medium 6 by irradiating the laser beam. The retrieved data are supplied to the decoder 18 via the disc controller 14. In response to an instruction from CPU 10, the encoder 16 encodes the user data and generates record data in units of ECC blocks (16 sectors) in case of DVD. The generated record data are supplied to the disc controller 14. The decoder 18 decodes the data in units of ECC blocks (16 sectors) reproduced from the optical disc medium 6 in response to an instruction from the CPU 10. An extended ECC block having 32 sectors has been proposed as a next-generation DVD medium.

A spiral groove track is formed on an optical disc 6 substrate for tracking in case of a recordable type optical disc medium 6 such as DVD-R, DVD-RW, or the like. Further, a multi-layer record layer of organic materials is usually formed on the substrate. The record data are recorded by focusing a high-power laser beam onto the record layer to form record pits by partially changing the property of the record layer. After the recording operation, the optical disc medium 6 has a same data format as that of the optical disc ROM medium (DVD-ROM or the like) with embosses. Such an optical disc medium 6 provides servo signals having properties similar to those of the optical disc ROM medium. Thus, the optical disc medium 6 has an advantage that the recorded data on the optical disc medium 6 can be reproduced easily by a read-only drive apparatus.

Figure 3:
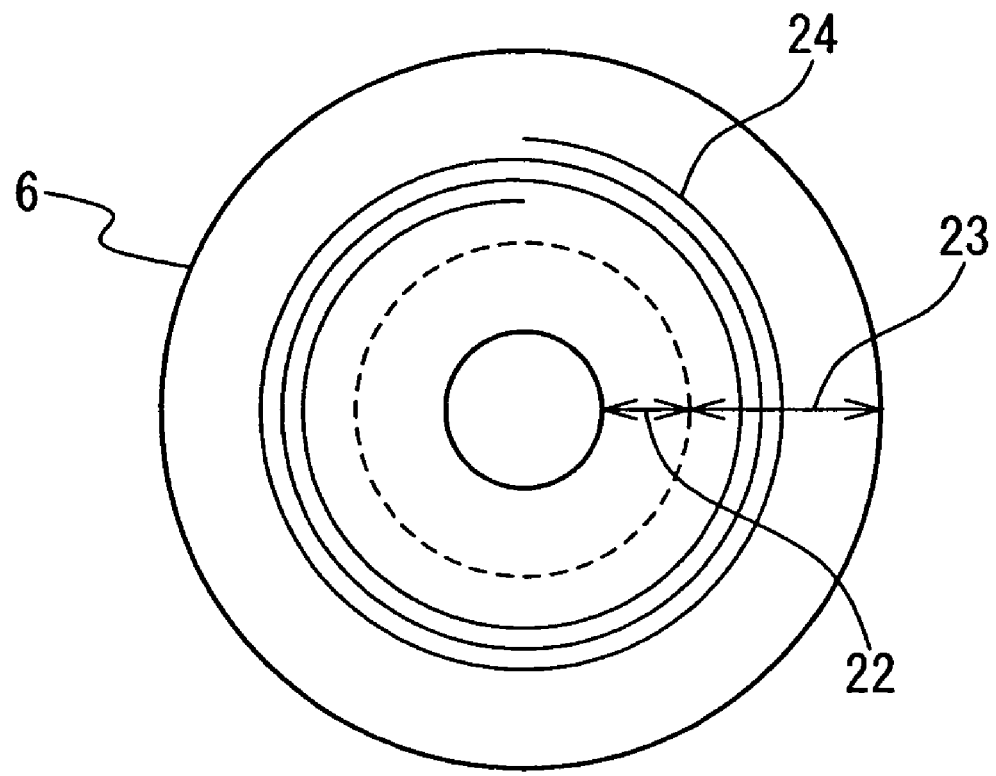
FIG. 3 is a diagram illustrating the configuration of areas of an optical disc medium according to the present invention.

As shown in FIG. 3, the recordable type optical disc medium 6 has a system area 22, a data area 23, and a read-out area (not shown) provided concentrically from the center. The system area 22 stores system data necessary for recording/reproducing operations such as disc data and data indicative of recorded tracks. The system area 22 contains an area for disc control data and an area used for testing a recording condition. The read-out area indicates the end of the area of the optical disc. Thus, when the read-out area is detected, the end of the optical disc medium is recognized. The data area 23 is located outside the system area 22, and stores user data. The spiral recording track 24 is formed in the data area 23.

Figure 4:
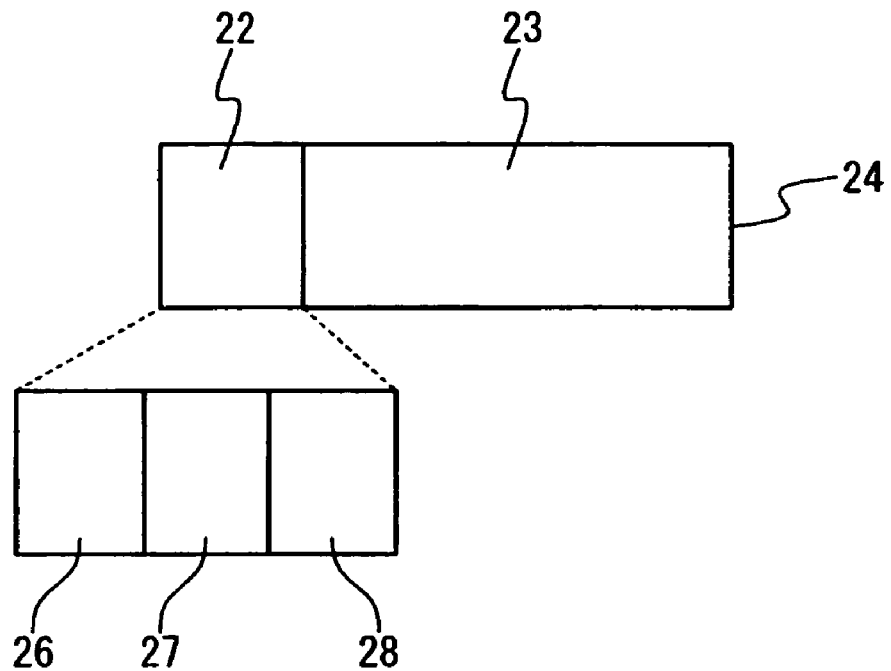
FIG. 4 is a diagram illustrating a logical configuration of the areas of the optical disc medium according to the present invention.
Figure 5:
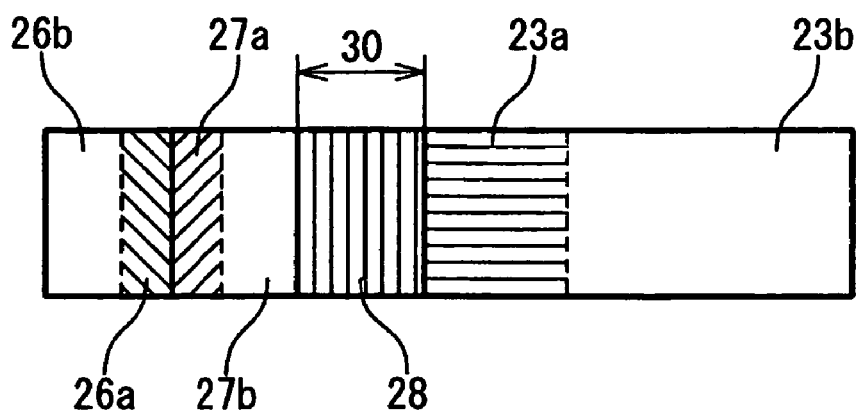
FIG. 5 is a diagram illustrating a record state of the conventional optical disc medium after a recording operation end process.
Figure 6:
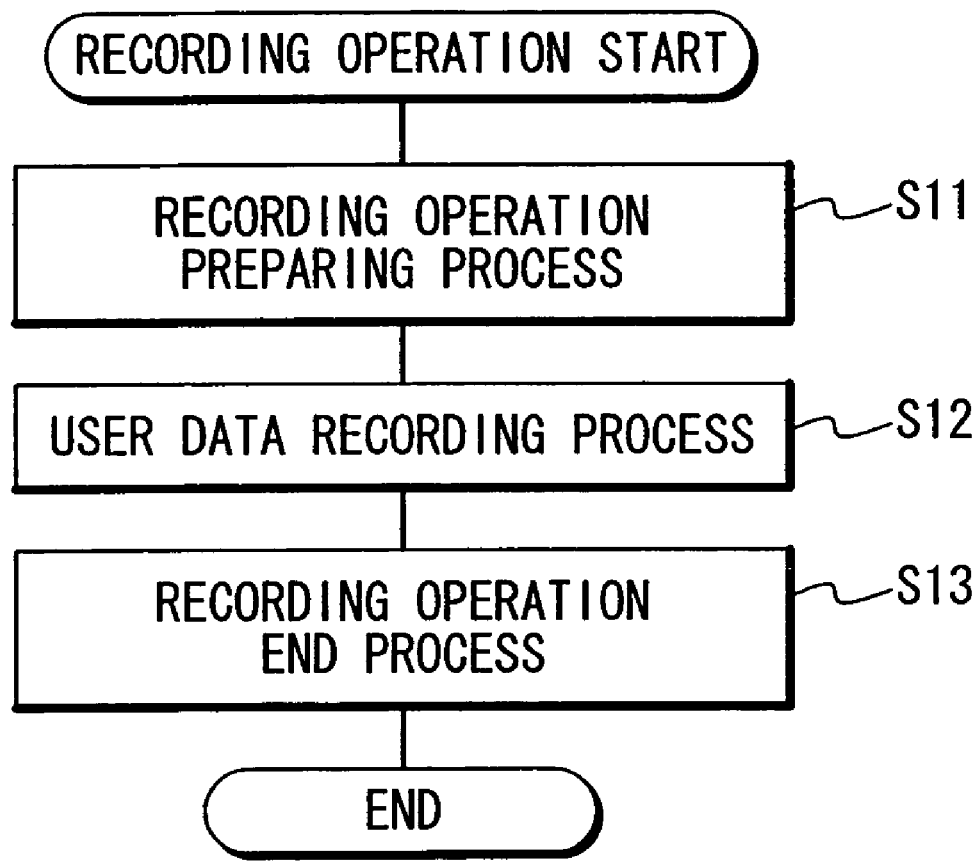
FIG. 6 is a flow chart showing a conventional recording operation for recording user data on the optical disc medium.

FIG. 4 shows the area structure of the optical disc medium 6 in the radial direction as a line. As shown in FIG. 4, the left side is on the side of inner circumference and the right side is on the side of outer circumference of the disc medium 6. System control data necessary for the optical disc apparatus 4 to record and reproduce data on and from the optical disc medium 6 and data indicative of a location of the data recorded on the optical disc medium 6 are recorded in the system area 22 in the inner circumference side. The system area 22 is mainly classified into three areas: a recording operation test area 26, a record control data area 27, and a user data lead-in area 28.

The user data lead-in area 28 is located most closely to the data area 23. The system control data is mainly recorded in the user data lead-in area 28 and is necessary for reproducing the data on the recordable type optical disc medium 6 on which data is already recorded by a read-only optical disc apparatus.

Data necessary for a recordable type optical disc apparatus to record the user data onto the data area 23, i.e., data indicating a next recordable location in the data area 23 and a usage status of the recording operation test area 26 are mainly recorded in the record control data area 27. The data in the record control data area 27 is updated, each time the recorded data quantity in the data area 23 increases. At this time, new data is written in the record control data area 27 in a predetermined unit from the inner circumference side to the outer circumference side. The recording operation test area 26 is used for a trial recording operation to determine an optimal recording condition. The trial recording operation is carried out by changing the power and recording waveform of a laser beam to optimize the recording condition into the data area 23. The recording operation test area 26 may be used in any order, but the outer area is usually used first.

First Embodiment

The optical disc medium 6 used for the optical disc apparatus 4 in the first embodiment will be described with reference to FIGS. 7A and 7B and FIG. 8. In the first embodiment, part of a guard area 30 in the user data lead-in area 28 is used as the record control data area 27. Thus, the user data lead-in area 28 is reduced to the minimum required to extend the data area 23.

The size of the system control data recorded in the user data lead-in area 28 is not so much large. In the conventional optical disc, data necessary for a reproducing operation is recorded in the neighborhood of the data area, and the same data is recorded multiple times or dummy data are record in the remaining area to secure the guard area 30.

Figure 7A:
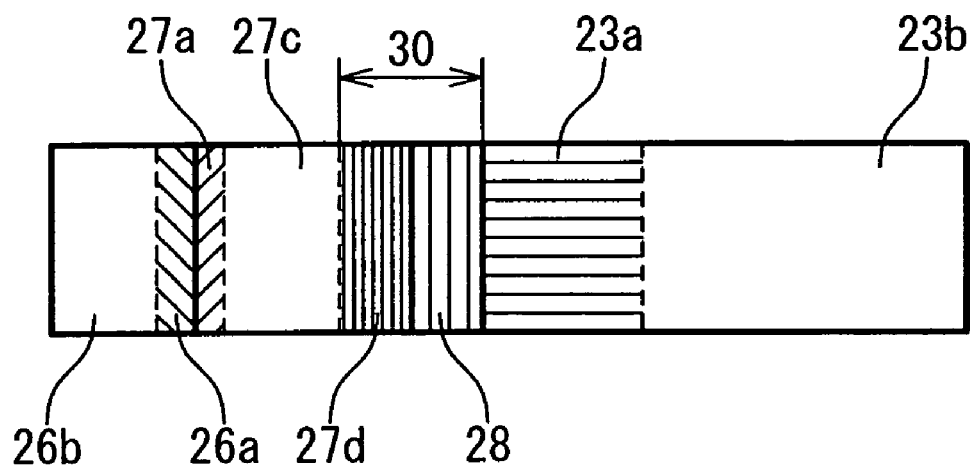
FIGS. 7A and 7B are diagrams illustrating the arrangement of respective areas of the optical disc medium according to a first embodiment of the present invention.
Figure 7B:
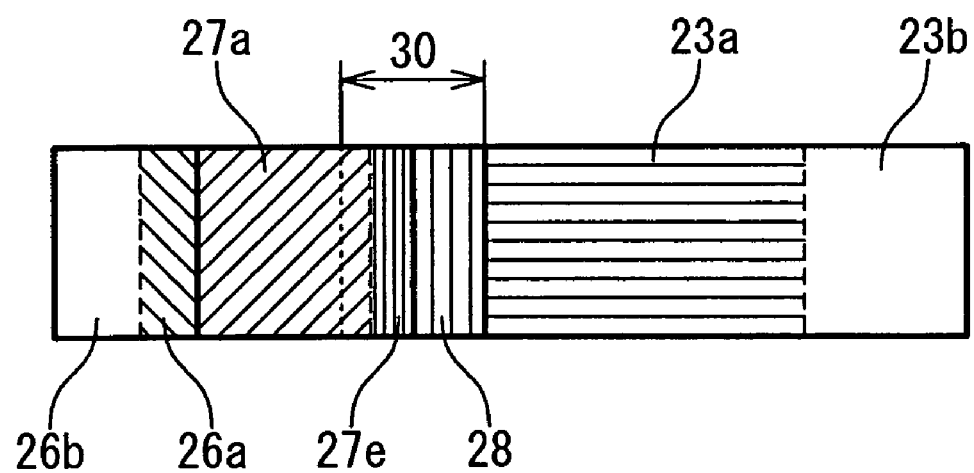
Figure 8:
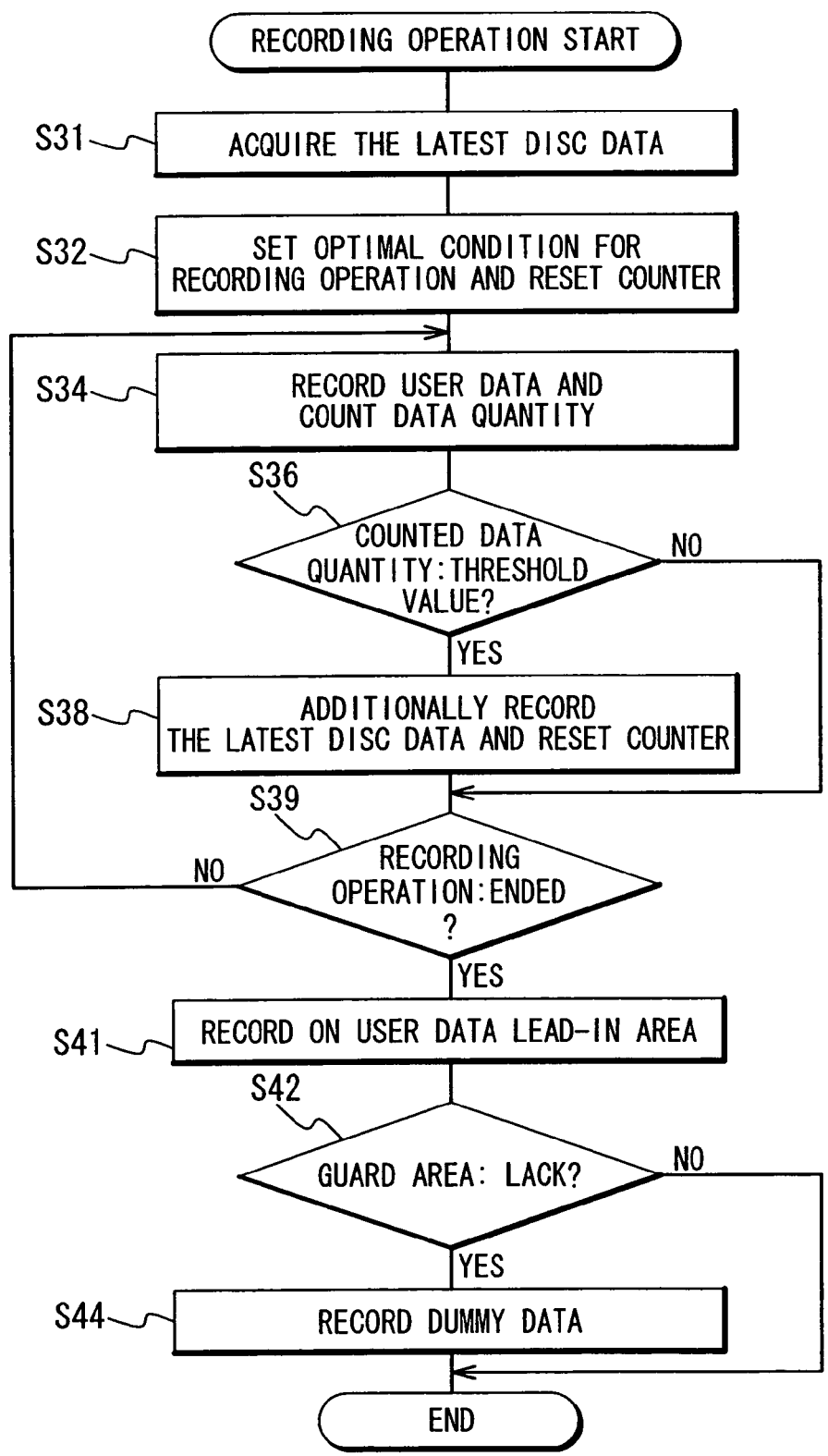
FIG. 8 is a flow chart illustrating a recording operation to the optical disc medium according to the first embodiment of the present invention.

FIGS. 7A and 7B are diagrams illustrating a state after the user data lead-in area 28 is reduced to the minimum required and the user data are recorded. FIG. 7A illustrates a case where a relatively smaller quantity of data is recorded, while FIG. 7B illustrates a case where a relatively larger quantity of data is recorded.

In FIG. 7A, the user data are recorded in the data area 23a. As a result, a data area 23b remains as a free area. Data necessary for reproduction is recorded in the user data lead-in area 28 after the user data are recorded. The recording operation test area 26a is used for determining an optimal recording condition when the user data is recorded. The recording operation test free area 26b is used for determining the optimal condition for the next recording operation of user data. Each time the user data are recorded in the data area 23, the record control data area 27a is used for recording control data and set to a recorded state. The record control data free area 27c remains as an unrecorded area, while a record control data recorded area 27d, whereon dummy data are recorded, functions part of the guard area 30 together with the lead-in area 28.

FIG. 7B shows a case when a relatively large quantity of data are recorded and the data area 23a extends in which the user data recorded. Together with the extension, the recording operation test area 26a used for determining the recording condition and the record control data area 27a used for recording control data are also extended. At this time, the guard area 30 includes a part of the record control data area 27a in which the control data are already recorded. As a result, the guard area 30 is a sum of record control data area 27a in which data are recorded, the user data lead-in area 28 and a part of the record control data area 27e remaining unrecorded. Accordingly, the guard area 30 is securely formed by recording dummy data in the record control data area 27e remaining unrecorded.

An operation when a part of the record control data area 27 is used as a guard area 30 will be described below with reference to FIG. 8.

When an optical disc medium 6 is loaded into the optical disc apparatus 4, the latest disc data is read out from the record control data area 27. If user data are already partially recorded, the latest disc data are read out from the last recorded location (S31).

Next, in order to optimize the recording condition in the data area 23, a trial recording operation is carried out by using the recording operation test area 26 while the power and waveform of a laser beam, and the like are changed. The optimal recording condition is determined based on the result of the trial recording operation and is set to the optical disc apparatus 4. At the same time, a counter (not shown) in the CPU is reset for determining the quantity of data to be recorded. When a user data record command is supplied from the host unit 2 connected to the optical disc apparatus 4, the user data are recorded (S32).

The user data are recorded additionally in the data area 23. The quantity of user data recorded is counted by the counter (S34).

It is determined whether the quantity of user data to be additionally recorded reaches a threshold value (S36). If the quantity of user data to be additionally recorded is larger than the threshold value (S36-YES), the latest control data is recorded additionally in the record control data area 27 for update of the data recorded in the record control data area 27, and the counter is reset (S38).

The update of the data in the record control data area 27 may be carried out not only when the count value of the counter reaches the threshold value, but also when the optical disc apparatus receives a command for securing a certain quantity of the data area 23 from the host unit or a command for removing the optical disc medium 6. The control is carried out so that the latest record status is always recorded in the record control data area 27.

The process of the steps S34 and S38 is repeated until there is no more user data to be recorded (recording end) in S39. In this manner, the user data are recorded.

After the recording operation of the user data is ended, a recording operation end process is carried out in response to a command for the recording operation end process, and the control data such as the record location of the user data necessary for reproduction by the read-only optical disc apparatus is recorded in the user data lead-in area 28 (S41).

Next, it is determined whether the guard area 30 is secured (S42). If the record control data area 27 is entirely recorded to the user data lead-in area 28 (S42-No), the guard area 30 is secured and no more any recording operation is carried out.

As shown in FIG. 7, when there is still an free area in the record control data area 27, dummy data are recorded in the record control data area 27 from the side of the user data lead-in area 28 to secure the guard area 30, because the guard area 30 is not sufficiently reserved in the user data lead-in area 28. As shown in FIG. 7A, if the record control data free area 27a is smaller, the guard area 30 is secured by recording the dummy data in the record control data area 27d when the user data lead-in area 28 is insufficient for the guard area 30. On the other hand, as shown in FIG. 7B, if the record control data area 27a is large enough to include a part of the guard area 30, the dummy data are recorded in the record control data area 27e from the user data lead-in area 28 to the record control data area 27a. Thus, the recorded area extends from the user data lead-in area 28 to the record control data area 27, securing the guard area 30. The order of the user data lead-in area 28 and the record control data area 27 may be exchanged (S44).

When a command for removing optical disc medium is supplied from the host unit 2 before the recording operation end process, the disc medium 6 is ejected without the recording operation end process. Thus, it is possible to set the optical disc medium 6 once again and to additionally carry out the recording operation. Also, a dummy data recording area of 50 to 100 μm in width may be provided as a guard area adjacent to the outer circumference of the data area 23a. In this case, the stability of reproduction is further accomplished. An area including this guard area may be regarded as a border area.

In this manner, it is possible to carry out the recording operation while securing the guard area 30 in the state that the user data lead-in area 28 is reduced to the minimum required. For example, the area width, which is conventionally demanded to be 100 μm or more, can be compressed to dozens μm or less. The reduced area may be allocated to the data area to increase a user-usable capacity of the disc. Instead, the reduced area may be allocated to the record control data area or the recording operation test area to increase the number of times of the additional recording operation.

Also, in the recording operation end process, record pits of the dummy data are formed not only in the user data lead-in area 28 but also in a part of the record control data area 27 on the data area side as a guard area 30. The access stability in the read-only optical disc apparatus can be secured as in the conventional example.

Further, when the record control data area 27 is recorded over the boundary of the area to be secured as a guard area before the recording operation end process is carried out, it is sufficient to record the dummy data in the record control data area 27e to secure an area of continuous record pits. In this case, the quantity of dummy data to be recorded during the recording operation end process decreases, shortening the process time.

Also, even when the sum of the record control data area 27 and the user data lead-in area 28 is equivalent to the guard area 30 required, the whole of record control data area functions as the guard area.

In case of a specification such as that of DVD-R, the recording operation end process may be a finalizing process to prohibit the additional recording operation or a border-closing process in the multi-border structure that allows reproduction by the read-only optical disc apparatus while a rewriting operation is allowed.

Second Embodiment

Figure 9:
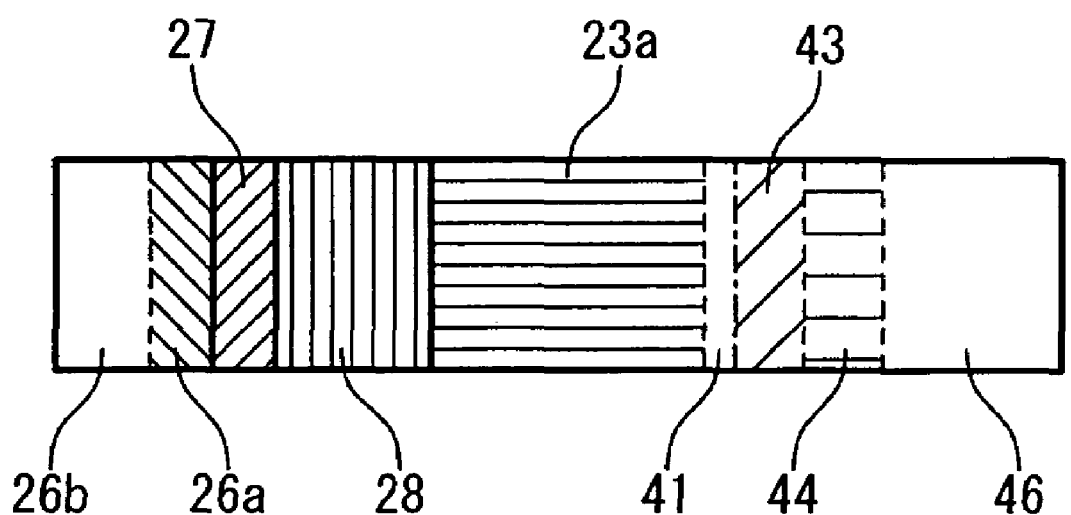
FIG. 9 is a diagram illustrating the arrangement of respective areas of the optical disc medium according to a second embodiment of the present invention.
Figure 10:
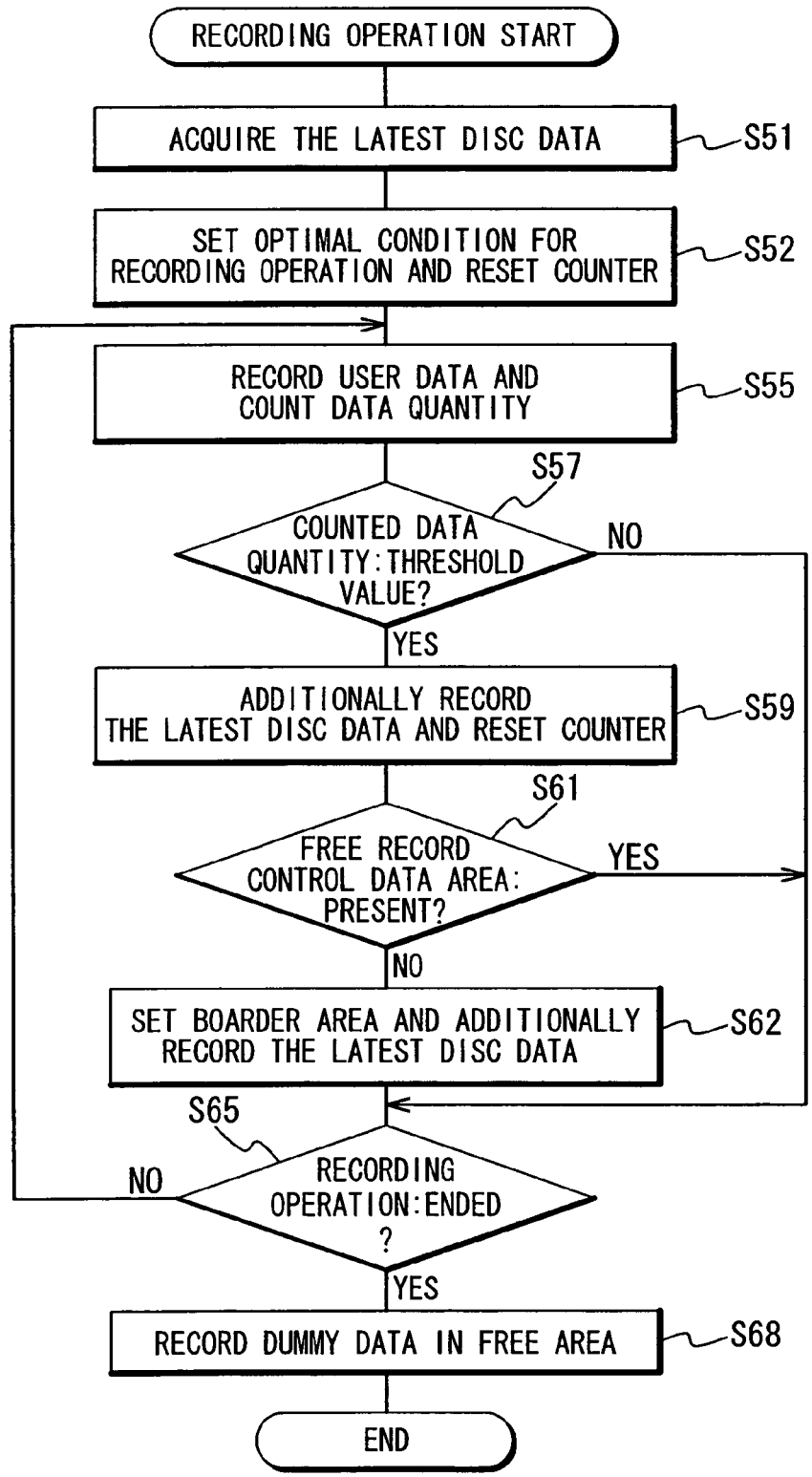
FIG. 10 is a flow chart illustrating a recording operation to the optical disc medium according to the second embodiment of the present invention.

The second embodiment will be described with reference to FIGS. 9 and 10. In the second embodiment, the record control data area 27 is reduced. In this case, the additional recording operation is repeated so that the record control data area 27 is lack. However, there is still a recordable area in the data area. Accordingly, a border area is newly provided as a partition outside the data area where the user data are recorded, and an extended record control data area is provided in the border area. If the same functions can be accomplished as in the conventional example even after reduction of the record control data area 27, such an advantage effect as extension of the data area 23 can be accomplished.

The area location will be described below with reference to FIG. 9. As user data are recorded in the data area 23a, data is also recorded in the recording operation test area 26a and the record control data area 27. When the data are recorded in the entire of record control data area 27, a new border area for partitioning is formed outside the user data-recorded area. An extended record control data area 43 is provided in the newly formed border area. When the user data are recorded additionally, the user data are recorded outside the border area (data area 44), and the record control data is recorded in the extended record control data area 43 of the border area. The border area is sometimes occupied only by the extended record control data area.

In the recording operation end process, a free area 41 in the border area is also filled with dummy record pits, to form a continuous sequence of record pits. Of course, if the free area remains in the extended record control data area 43, the free area is also filled with the dummy record pits to form a continuous sequence of record pits. If the location data of the border area or the extended record control data area is recorded as the latest data in the record control data area of the system data area, the optical disc apparatus 4 can detect the latest data from the extended record control data area of the border area. It is possible to record other data such as the location for the next user data to be recorded in the border area.

The conventional CD-R and DVD-R media have a so-called multi-session or multi-border function, which allows the user data to be partitioned with a border where the system control data is recorded. The present invention may be combined with the conventional function. In this manner, it is possible to extend the record control data area, as far as a recordable free area remains in the data area.

Of course, it is possible to newly form the border zones in a multi-border structure of the conventional example, independent of the quantity of the remaining record control data area. In the multi-border structure of the conventional example, it is necessary to carry out the recording operation end process for closing the existing border, in order to allow the reproduction by the read-only optical disc apparatus. In this case, the dummy data necessary for the guard area are recorded on the remaining free area in the existing record control data area or the extended record control data area. Also, in the user data recording operation, the extended record control data area in new border zone is used.

The recording operation for such an arrangement of areas will be described below with reference to FIG. 10. When the optical disc medium 6 is loaded into the optical disc apparatus 4, the latest data is first read out from the record control data area 27. When user data are partially recorded, the additional recording operation of new data is controlled behind the last recorded location (S51).

Next, the trial recording operation is carried out by using the recording operation test area 26 while the power and recording waveform of a laser beam, and others are changed for optimization of the recording condition in the data area 23. An area to which the trial recording operation is carried out represented by 26a, and the area 26a is extended each time the trial recording operation is carried out. The optimal recording condition is determined and set based on the result of the trial recording operation. In addition, a counter (not shown) in the CPU 10 is reset for determining the quantity of data to be recorded. In response to the user data record command supplied from the host unit 2 connected to the optical disc apparatus 4, user data are recorded (S52).

The user data are recorded in the data area 23 additionally. The quantity of user data recorded is determined by the counter (S55).

It is determined whether the additional recorded data quantity obtained by the counter reaches a threshold value or not (S57). If the quantity is larger than the threshold value (S57-YES), the latest control data is recorded additionally in the record control data area 27 for update of the data already present in the record control data area 27. Also, the counter is reset (S59).

The update of the data present in the record control data area 27 may be carried out not only when the count value of the counter reaches the threshold value, but also when the optical disc apparatus receives a command for securing a certain quantity of data area 23 or a command for ejecting the optical disc medium 4 from the host unit 2. The control is carried out so that the latest recording status is always recorded in the area.

Because the record control data free area 27 is decreased through the update of data, it is determined whether a free area still remains in the record control data area 27 (S61). When the available capacity of the record control data area 27 decreases to a threshold value or less (S61-NO), a new border area is formed immediately behind the user data recorded in data recorded area 23a of the data area 23. The location of the border area is recorded as the latest data in the record control data area 27 (S62). In an additional recoding operation of the following user data, the latest system control data is additionally recorded in the record control data area 43 in the border area. When the record control data area 43 in the border area is full entirely, it is possible to additionally form a new border area in data area 46.

The procedures of steps S55 to S62 are repeated until there is no more user data to be recorded (recording termination) at a step S65. In this manner, the user data are all recorded.

After the. recording operation of the user data, the recording operation end process is carried out in response to a command from the host unit 2. In the recording operation end process, the control data necessary for reproduction by the read-only optical disc apparatus such as the record location of the user data are recorded in the user data lead-in area 28. If any border area exists, dummy data are recorded in a free area of the border area before end of the process (Step S68). If the border area is already formed, there is a case that data are recorded to allow the read-only optical disc apparatus to reproduce the user data in the inner circumference than the border area. In this case, the user data lead-in area 28 is also recorded when the border area is formed. If a dummy data recording area of 50 to 100 μm in width as a guard area is formed adjacent to the outer circumference of the data recorded area 23a, it is possible to further increase in the stability of reproduction. The area including the guard area may be regarded as a border area. This is equivalence to a structure containing the multi-border structure in the conventional DVD-R medium.

In this manner, it becomes possible to effectively use the system area. The first and second embodiments may be applied independently or in combination.

Third Embodiment

Figure 11:
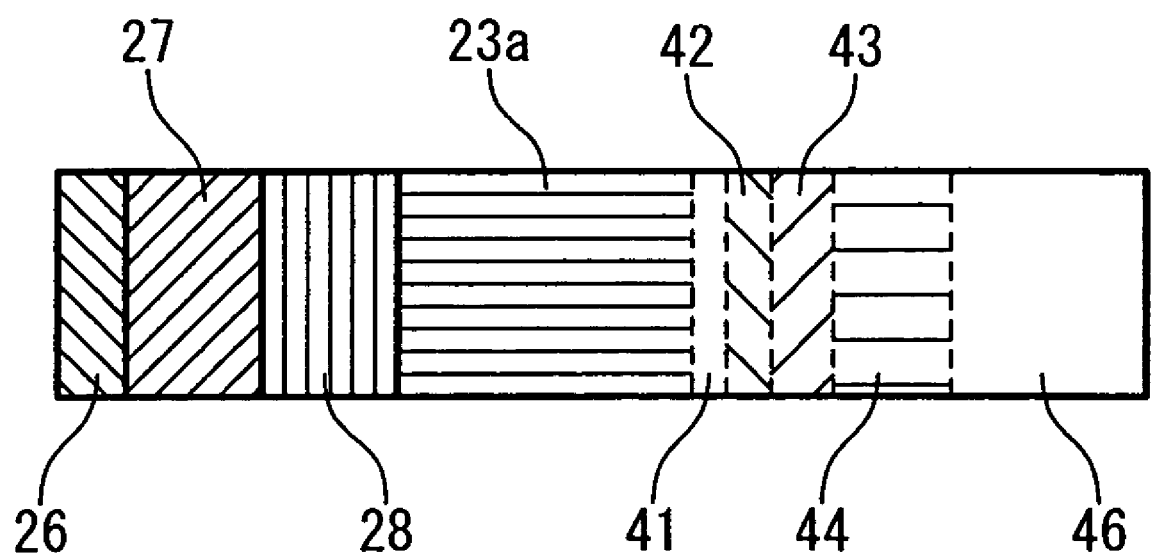
FIG. 11 is a chart illustrating the arrangement of respective areas of the optical disc medium according to a third embodiment of the present invention.

The third embodiment will be described below with reference to FIGS. 11 and 12. In the third embodiment, the recording operation test areas 26 are formed in the border areas. By distributing the recording operation test areas 26 in the data area 23, it becomes possible to determine a more optimal recording condition, because the trial recording operation can be carried out to the data area 23 where the user data are recorded actually. In the third embodiment, the recording operation test area 42 is formed in the border area formed in the second embodiment.

The area arrangement will be described with reference to FIG. 11. When the user data are recorded in the data area 23a, data are recorded also in the recording operation test area 26a and the record control data area 27. When the entire recording operation test area 26 and the record control data area 27 are consumed, a new border area for partitioning is formed outside the user data recorded area. The recording operation test area 42 and the extended record control data area 43 are formed in the newly formed border area. When the user data are recorded additionally, the optimal recording condition is determined by using the recording operation test area 42 in the border area. Under the optimal recording condition, additional user data are recorded in the data area 44 outside the border area. The record control data concerning the additional recording operation in the data area 44 is recorded in the extended record control data area 43 of the border area.

In the recording operation end process, a free area 41 remaining in the border area is also filled with a sequence of dummy record pits. Because the data recorded through the trial recording operation cannot be sometimes reproduced satisfactory including an address, it is necessary to identify the recording operation test area and to skip the recording operation test area during the reproduction. For example, the recording operation test area is recognizable, by setting a flag (not shown) indicating the recording operation test area in the border area or by providing an address table (not shown) indicating the location of recording operation test area in the border area. The method of setting the flag in the record block is more preferably, because there is a greater freedom in setting the location of the border area.

An operation for forming the recording operation test area in the border area will be described below with reference to FIG. 12. When the optical disc medium 6 is loaded into the optical disc apparatus 4, the latest data is first read out from the record control data area 27. If user data have been already partially recorded, the control is carried out for addition user data to be recorded behind the last recorded location (S71).

Next, a trial recording operation is carried out by using the recording operation test area 26 while changing the power and recording waveform of a laser beam and others for optimization of the recording condition in the data area 23. The optimal recording condition is determined and set from the result of the trial recording operation. In addition, a counter (not shown) in the CPU 10 is reset for determining a quantity of the user data to be recorded. In response to a user data record command sent from the host unit 2 connected to the optical disc apparatus 4, the user data are recorded (S72).

The user data are recorded in the data area 23 additionally. The quantity of the user data recorded is determined by the counter (S74).

It is determined whether the quantity of the user data recorded additionally reaches a threshold value (S76). If the user data quantity is equal to or larger than the threshold value (S76-YES), the latest control data is recorded additionally in the record control data area 27 for update of the record control data previously present in the record control data area 27, and the counter is reset (S77).

The update of the record control data in the record control data area 27 may be carried out not only when the count value of the counter reaches the threshold value, but also when the optical disc apparatus receives a command for securing a certain quantity of the data area 23 or a command for ejecting the optical disc medium from the host unit. The control is carried out in such a way that the latest recording status is always recorded in the record control data area 27.

Because the free area of the record control data area 27 decreases through the update of the record control data, it is determined whether the free area still remains in the record control data area 27. In this case, it is preferable to determine the free area of the recording operation test area 26 at the same time. In this example, the free area of the record control data area 27 is determined (S79). When the free area of the record control data area 27 decreases to a threshold value or less (S79-NO), a new border area is formed immediately behind the user data recorded area 23a of the data area 23 (S81). Because a new recording operation of the user data is started from the location of the border area, the recording operation test area 42 formed in the border area is used for determining the optimal recording condition in the data area. After the optimal recording condition is determined by using the recording operation test area 42, the recording condition is set (S82). The location of the border area is recorded as the latest record control data in the record control data area 27 (S83). In the following additional recording operation of user data, the latest system control data is recorded additionally in the record control data area 43 within the border area. When the record control data area 43 in the border area is consumed entirely, an additional new border area is formed in data area 46.

The steps from the S74 to the S83 are repeated until there is no more user data to be recorded (recording end) at a step S85. In this manner, the user data are recorded.

When the recording operation of the user data ends, a recording operation end process is carried out in response to a command from the host unit. In the recording operation end process, the control data such as the record location of the user data necessary for reproduction by the read-only optical disc apparatus are recorded in the user data lead-in area 28. If there is any border area, the dummy data are recorded in the free area in the border area before termination of the process (S87).

In this manner, it becomes possible to effectively use the system area. Further, the user data can be recorded under the optimal recording condition.

Also, an unused optical disc medium on which no data is recorded may be used as an optical disc medium 6 to which the methods in these embodiments can be applied.

In this manner, advantageous effects in which the system area 22 is reduced for using as the data area 23 so that the recording capacity is extended will be described below, by taking as an example, a recordable type optical disc medium in which a next-generation blue semiconductor laser beam is used as a light source.

An optical disc medium with a same size as a DVD disc is reported in which a track pitch is 0.4 µm and a data bit density is 0.153 µm. Supposing that a data area is formed in an area from 24.1 mm to 58.0 mm in a radial direction, a user data capacity of about 15 G bytes can be accomplished when the encoding efficiency is 85%. Supposing that the width of an area for record pits formed on the inner circumference side in the recording operation end process is approximately 100 µm, the area consumes a capacity of as much as 26M bytes, if the area is allocated to the user data lead-in area. Because the system control data actually necessary for reproduction is not more than 1M bytes, there is no problem even if the width of the area is decreased to approximately 10 µm. If an area of 200 µm in width is secured as the record control data area, the area has a capacity of 52M bytes. The update of more than 800 times can be allowed if the quantity of the control data for update is assumed to be 64K bytes. Thus, for the recording operation end process, an area having the width of 100 µm for dummy pits is sufficient as a sum of 10 µm for the user data lead-in area and 90 µm for a part of the record control data area.

Fourth Embodiment

By the way, if it is possible to transfer system data from the optical disc medium to the recordable type optical disc apparatus, it becomes possible to set the optimal system data to the optical disc medium. Below, the fourth embodiment will be described.

Figure 13A:
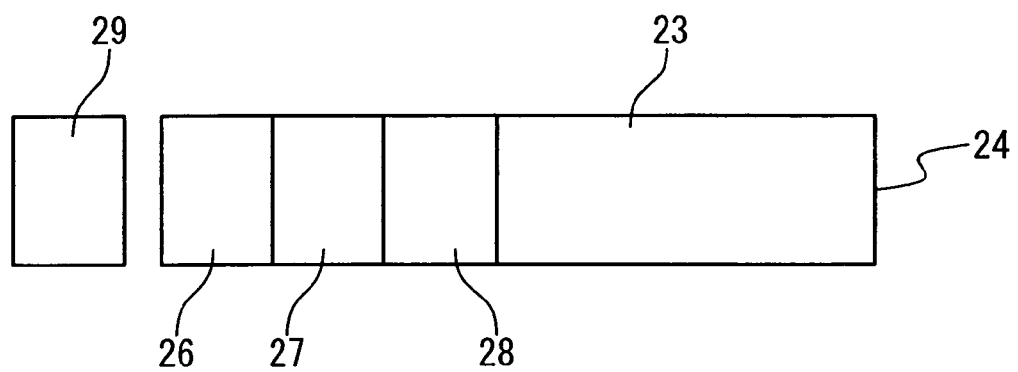
FIGS. 13A and 13B are diagrams illustrating the arrangement of respective areas of the optical disc medium according to a fourth embodiment of the present invention.
Figure 13B:
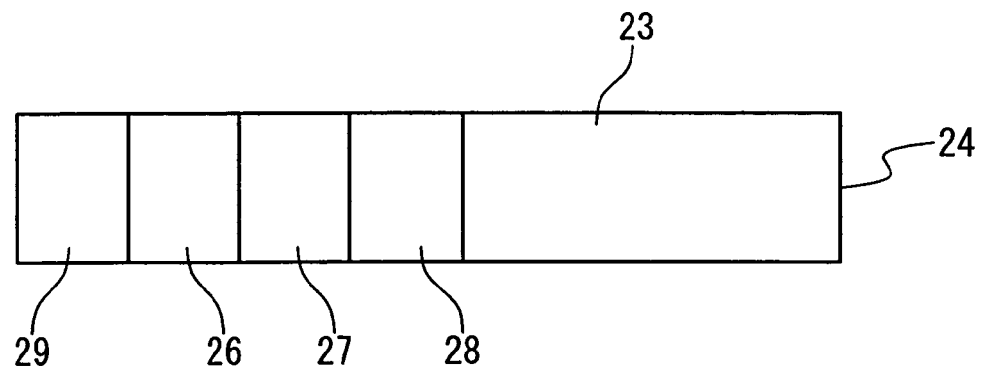

As shown in FIG. 13B, in the optical disc medium 6 according to the fourth embodiment, a pre-pit area is provided at the innermost circumference area of the system area, and a part of the system data is recorded. The recording track 24 has a data area 23, and a system area 22 of a test data recording area 26, a record control data area 27, and a user data lead-in area 28, in addition to a pre-pit area 29. It is possible to record such data as an area location and a processing method previously in the pre-pit area 29. Also, in the pre-pit area 29 can be recorded data that the user cannot modify, for example, data for managing copyright.

The pre-pit area 29 may be formed anywhere in the system area. However, in such a case, it would be difficult to form the pre-pit area as a continuous area, because a condition for forming a recordable groove-shaped track on a substrate and a condition for forming the pre-pit are different from each other. In such a case, as shown in FIG. 13A, if an independent pre-pit area 29 is formed at the inner circumference side, it is possible to form an area with no track between the pre-pit area and the record area. Thus, it is possible to establish a practically useful configuration.

Fifth Embodiment

The fifth embodiment will be described below with reference to FIGS. 14A to 14D, 15 and 16. The timing of forming an extended record control data area and the capacity of the extended record control data area will mainly be described in the fifth embodiment.

FIG. 14A to 14D show a part of the data area 23. The user data are recorded in each of the so-called reserved recording zone (R-Zone) in the data area 23. As shown in FIG. 14A, reserved recording zones 51 and 52 are set in the data area 23 and the user data are already recorded. In this state, it is supposed that new user data are recorded additionally in the area 53 of the data area. At this time, because the end location of the record is not yet set, an area subsequent to the record end position of area 52 of the data area is in the free state. That is, the area 55 is not present yet, and the end position of the area 53 is not defined. The reserved recording zone is set in the data area. It is possible to set a plurality of reserved recording zones at a time. As shown in FIG. 14C, three reserved recording zones: a first area RZ1, a second area RZ2, and a third area RZ3', are secured from the inner circumference side to the outer circumference side. The end position of the third area RZ3' is not set and is an area in an open state.

The three areas in the reserved recording zone 53 are managed respectively based on the start addresses: a start address RZA1 of the first area RZ1, a start address RZA2 of the second area, and start address RZA3 of third area. The end addresses of the first area RZ1 and the second area RZ2 have determined, because the second area RZ2 and the third area RZ3 are set. An address immediately before the start address of the current area is designated as the end address of the previous area. The end address of the third area RZ3' is not determined. Data are recorded in the three reserved recording zones of the reserved recording zone 53 from the start addresses, respectively. The purpose and functions of the three reserved recording zones are not particularly limited, but each zone is usually used as separated for an area for data management and an area for recording user data.

After the user data are record in the reserved recording zone 53, the end address RZAE of the third area RZ3' is determined. That is, as shown in FIG. 14B, the start and end addresses of the three reserved recording zones are determined, and the range of the reserved recording zone 53 is defined. When the range of the reserved recording zone 53 is determined, an extended record control data area for storing record control data is formed in the data area 23. After recording of the user data in the reserved recording zone 53, it is determined whether an extended record control data area 55 is to be formed. If it is necessary to form an area for recording new record control data, for example, if there is no area for recording the new record control data in the record control data area 27 of the system area 22, the extended record control data area 55 is formed in the data area 23. At this time, the new extended record control area 55 is formed in an area adjacent to the reserved recording zone 53 where the user data are have been recorded. Thus, it becomes possible to use the data area 23 more efficiently.

Figure 15:
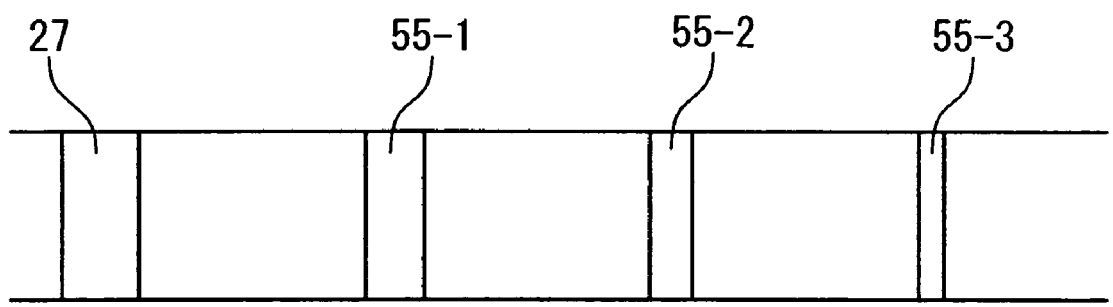
FIG. 15 is a diagram showing the arrangement of expanded record control data areas of the optical disc medium according to the fifth embodiment of the present invention.

As described above, if there is no area sufficient for recording the record control data, the extended record control data areas 55 are formed in the data area 23 sequentially. As the quantity of the user data recorded increases, an area where user data can be additional recorded becomes a smaller, and the quantity of the record control data decrease. User data are recorded from the inner circumference side to the outer circumference side on the optical disc medium 6, and the remaining free capacity gradually decreases. As a result, the sizes of the extended record control data areas 55 (55-1, 55-2 and 55-3) secured in the data area 23 decrease, as the data recording operation advances to the outer circumference or the remaining capacity decreases, as shown in FIG. 15. That is, the extended record control data area 55-2 is narrower than the extended record control data area 55-1, and the extended record control data area 55-3 is narrower than the extended record control data area 55-2. The capacity of extended record control data area 55 is determined according to the location of extended record control data area 55 in the radial direction or the remaining capacity of the optical disc medium 6. For the easiness of capacity setting, it is preferable to allocate several different capacities, for example, three capacities.

Figure 16:
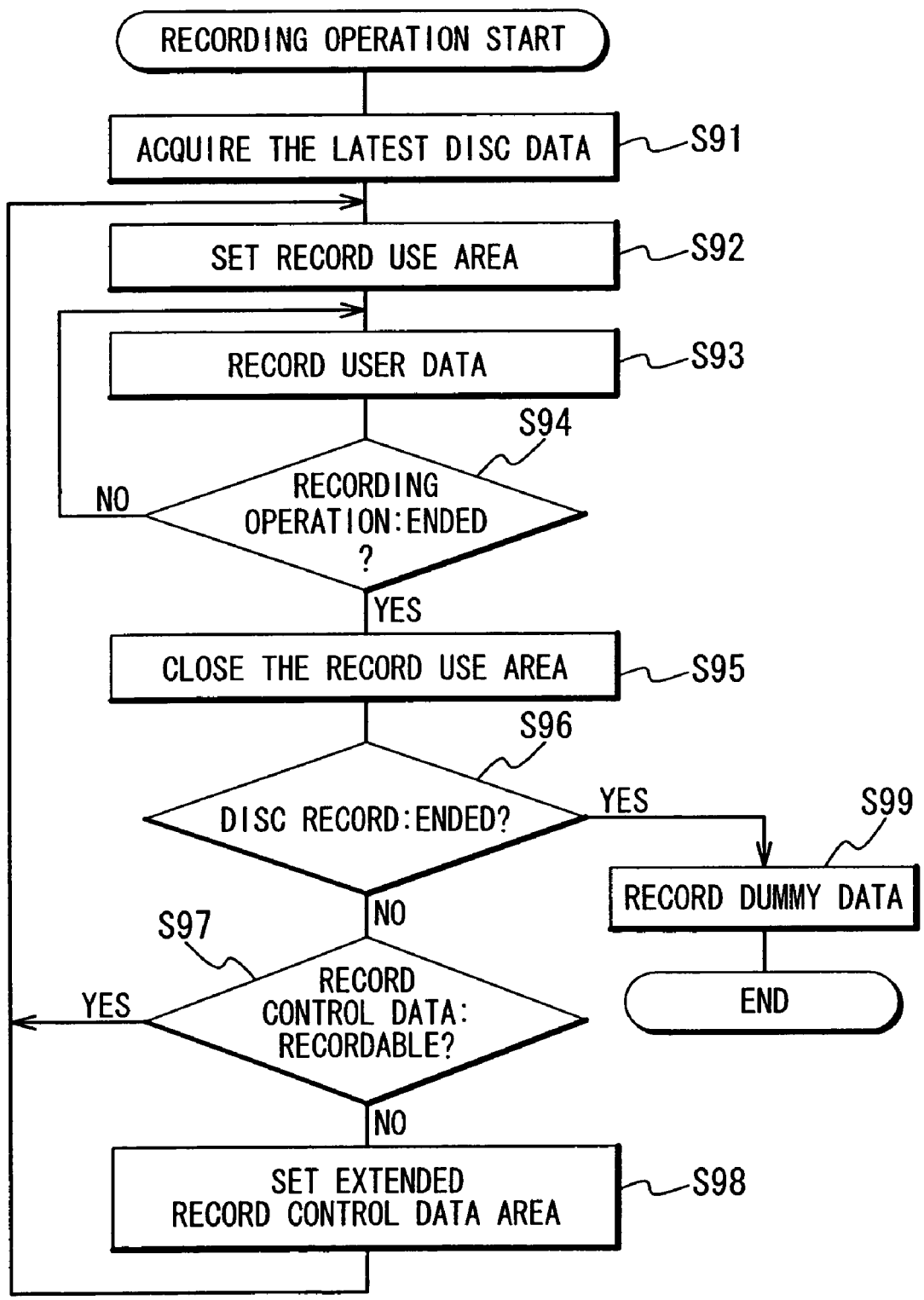
FIG. 16 is a flow chart illustrating a recording operation to the optical disc medium according to the fifth embodiment of the present invention.

An operation of the optical disc record apparatus that records the user data while forming the extended record control data area 55 in the data area 23 will be described below with reference to FIG. 16. When an optical disc medium 6 is loaded into an optical disc record apparatus, the latest system control data is read out from the record control data area 27. If user data have been already partially recorded, the control is carried out after the last recorded location (S91).

The reserved recording zone 53 is set for recording the user data. The area setting is carried out in response to an instruction from the host unit 2, because it depends on an application. Namely, the reserved recording zone is managed by host unit 2. For example, the first area RZ1 and the second area RZ2 are used for the area where the data for managing the user data is recorded, and the user data are recorded in the third area RZ3. The start and end addresses of the first area RZ1 and the second area RZ2 have been set. The start address of the third area RZ3 has been set but the end address is not set yet (S92).

Based on the address allocated to the reserved recording zone 53, all of the user data are recorded continuously in reserved recording zone 53 (S93). After the user data are recorded (S94-YES), the reserved recording zone 53 is closed. Namely, the end address RZAE of the third area RZ3 is determined, and the range of the reserved recording zone 53 is defined (S95).

It is determined whether the recorded user data are the last to be recorded on the optical disc medium 6. If there is a possibility of other user data being recorded (S96-NO), it is determined whether an area for adding the record control data still remains in the record control data area 27 or the extended record control data area 55 (S97), because the end address of the reserved recording zone 53 has already been set. If there is an area sufficient for additionally recording the record control data (S97-YES), the control returns to the step S92 to set the next reserved recording zone. If there is no area for additional recording operation of the record control data (S97-NO), an area for additional recording operation of the record control data is secured (S98). At this time, the fact that there is no area sufficient for recording the record control data is notified to the host unit 2. Instead, if the area for recording the record control data may be managed by host unit 2, an instruction may be sent from the host unit 2 to the optical disc record apparatus 4 such that a new area for recording the record control data is secured. Yet instead, after securing a new area for recording the record control data, the optical disc record apparatus 4 may notify the securing of the new area to the host unit 2.

The range of the secured extended record control area 55 is formed in the data area 23 adjacent to the closed reserved recording zone 53. The capacity of secured extended record control area 55 is determined based on the location of the secured area in the radial direction or the remaining capacity of optical disc medium 6. For example, it is supposed that the data area 23 is formed on the optical disc medium 6 in the area from 24.1 mm to 58.0 mm in the radial direction and three extended record control areas different in capacity are sequentially used on an optical disc medium 6 having a user data capacity of 15G bytes of a CLV (Constant Linear Velocity) type. If the record control data is updated in units of 100 megabytes in average, it is sufficient to secure the following capacities: a capacity of 200 ECC block is for the extended record control area in the inner area than the location of 35 mm in the radial direction; 150 ECC blocks for an area in a range of 35 mm to 46 mm in the radial direction; and approximately 100 ECC blocks for an area in a range of 46 mm to 58 mm in the radial direction.

Once the extended record control data area 55 is set, the control returns to the step S92 to set the next reserved recording zone for recording the next user data. When the above process is repeated and all of the user data are recorded on the optical disc medium 6 (S96-YES), the optical disc record apparatus 4 receives a command for a recording operation end process from the host unit 2 and carries out the recording operation end process. Control data such as record location and the like necessary for reproduction by a read-only optical disc apparatus are recorded in the user data lead-in area 28. Also, dummy data are recorded in the free area remaining in the data area, and the entire recorded area becomes reproducible continuously (S99).

As described above, the extended record control data areas 55 are formed sequentially in the data area 23, when there is no area sufficient for recording the record control data or the record control data is needed to be recorded in the area other than system area 22. The capacity or the extended record control data area decreases as the area is set in the outer circumference side or the remaining capacity decreases. Thus, it becomes possible to record the user data efficiently on the optical disc medium.

In the above description, it is assumed that the optical disc is an addition recordable type optical disc medium. However, the present invention can be applied to a rewritable optical disc medium. Also, the present invention can be applied to an optical disc medium in which the data for controlling the recording operation are recorded separately in the record control data area and the recording operation test area.

According to the present invention, the most of the optical disc recording can be used for data recording without hindering a system operation. Also, the user accessible record data quantity of the optical disc medium can be increased.

Also, the number of times of an additional recording operation can be increased, and favorable recording can be achieved over the entire surface of the optical disc medium.

Also, the recording operation can be carried out in an optimal condition to areas different in recording speed.

What is claimed is:

1. An optical disc medium comprising a system area and a data area,
   wherein said system area comprises:
   a recording operation test area to which a trial recording operation is carried out to determine an optimal record condition when data is recorded in said data area;
   a record control data area where data necessary to record user data on said data area is recorded; and
   a user data lead-in area necessary to reproduce said user data from said optical disc medium, and
   dummy data are recorded to a portion of said record control data area on a side of said user data lead-in area to prevent a track-out when said data area is accessed.

2. The optical disc medium according to claim 1, wherein said dummy data is recorded until a total width of the portion with record control data and dummy data in a radial direction becomes a predetermined value or more.

3. The optical disc medium according to claim 1, wherein a trial recording operation is carried out to an extended recording operation test area provided into said data area.

4. The optical disc medium according to claim 3, wherein said extended recording operation test area is identified based on a flag recorded in a area which is provided in said data area.

5. An optical disc apparatus which drives an optical disc medium comprising a system area and a data area,
   wherein said system area comprises:
   a recording operation test area to which a trial recording operation is carried out to determine an optimal record condition when data is recorded in said data area;
   a record control data area where data necessary to record user data on said data area is recorded; and
   a user data lead-in area necessary to reproduce said user data from said optical disc medium, and
   dummy data are recorded to a portion of said record control data area on a side of said user data lead-in area to prevent a track-out when said data area is accessed.

6. The optical disc apparatus according to claim 5, wherein said optical disc apparatus carries out a trial recording operation to an extended recording operation test area provided into said data area.

7. The optical disc apparatus according to claim 6, wherein said optical disc apparatus identifies said extended recording operation test area based on a flag recorded in a flag area which is provided in said data area.

8. The optical disc apparatus according to claim 7, wherein said dummy data is recorded until a width of the portion in a radial direction becomes a predetermined value or more.

9. An optical disc data recording method comprising:
   providing an optical disc medium in an optical disc apparatus, wherein said optical disc medium comprises a system area and a data area,
   wherein said system area comprises:
   a recording operation test area to which a trial recording operation is carried out to determine an optimal record condition when data is recorded in said data area;
   a record control data area where the data necessary to record user data in said data area is recorded; and
   a user data lead-in area which is necessary to reproduce said user data from said optical disc apparatus,
   recording dummy data in a portion of said record control data area on a side of said user data lead-in area to prevent a track-out when said data area is accessed.

10. The optical disc medium according to claim 9, wherein said recording dummy data comprises:
    recording said dummy data until a total width of the portion with record control data and dummy data in a radial direction becomes a predetermined value or more.

11. The optical disc data recording method according to claim 9, further comprising:
    carrying out a trial recording operation to an extended recording operation test area provided into said data area.

12. The optical disc data recording method according to claim 11, further comprising:
    identifying said extended recording operation test area based on a flag recorded in a flag area which is provided in said data area.

* * * * *